United States Patent [19]

Grabowski

[11] 4,225,212

[45] Sep. 30, 1980

[54] OUTSIDE REAR VISION MIRROR

[76] Inventor: Werner Grabowski, 6309 Steinway St. (Franconia), Alexandria, Va. 22310

[21] Appl. No.: 911,839

[22] Filed: Jun. 2, 1978

[51] Int. Cl.³ .............................................. G02B 7/18
[52] U.S. Cl. ..................................................... 350/62
[58] Field of Search ............... 350/62, 307; 74/501 M

[56] References Cited

U.S. PATENT DOCUMENTS

| | | | |
|---|---|---|---|
| 3,045,551 | 7/1962 | Bonanno | 350/62 |
| 3,711,179 | 1/1973 | Takeda | 350/62 |

FOREIGN PATENT DOCUMENTS 1392428  2/1965  France ........................................ 350/62

Primary Examiner—Jon W. Henry
Attorney, Agent, or Firm—Mason, Mason and Albright Lucas

[57] ABSTRACT

A rear-vision mirror for attachment to the outside of an automobile or other vehicle which is caused to spin by an electrical motor or relative wind to dislodge water, snow or ice. The mirror may be in the form of a disc or a cylinder.

3 Claims, 7 Drawing Figures

OUTSIDE REAR VISION MIRROR

BACKGROUND OF THE INVENTION

Rear vision in a moving vehicle can be a significant problem to an operator in times of foul weather inasmuch as the rear window of the vehicle may be difficult to see through because of the accumulation of water, snow or ice thereon. Special equipment may be required such as a rear window wiper. The weather conditions which obscure vision through a rear window also often obscure vision in an outside rear vision mirror. Driving in foul weather is thus rendered more dangerous, not only by the poor road conditions caused by the weather but due also to the inability of the driver to utilize effectively rear vision mirrors which may be available on the vehicle. This problem has existed for many years.

SUMMARY OF THE INVENTION

The inventor has discovered that if an outside rear vision mirror is caused to rotate at a rapid rate, it will effectively dislodge water thereon from rain or other sources, and accumulations of snow or ice. By carefully providing that the mirror surface is rotated without significant deviation within its surface of reflection, the mirror continues to function effectively as an accurate reflector of visual images. Although preferably the spinning of the rear vision mirror in accordance with the invention is accomplished by an electrical motor connected selectively to rotate the mirror, other means of causing the desired rotation can be utilized, such as the relative wind. Thus, an important object of the invention is the provision of a mirror for rear vision from a vehicle which may be rotated selectively or continuously whereby water, snow or ice is dislodged therefrom.

A further object of the invention is to provide a rotatable mirror wherein ice, snow or water may be dislodged by means of the relative rotation of the mirror by a closely adjoining wiper surface.

A still further object of the invention is to provide a rotating rear vision mirror which is powered by the relative wind and which is coupled with a ring which also rotates and provides an energy storage to maintain the rotation of the mirror for a period when the vehicle is stopped or proceeding slowly and sufficient relative wind is no longer available to power the mirror's rotation.

A yet further object of the invention is to provide a rotating mirror which will dislodge water, ice and snow by centrifugal force, with the material so dislodged being guided downwardly relative to the vehicle on which the mirror is mounted.

Other objects, adaptabilities and capabilities will appear as the description progresses, reference being had to the accompanying drawings in which:

BRIEF DESCRIPTION OF THE DRAWINGS

FIG. 3 is a front elevation of another embodiment of the invention illustrating a mirror for trucks and the like;

DESCRIPTION OF THE PREFERRED EMBODIMENTS

Figure 1:
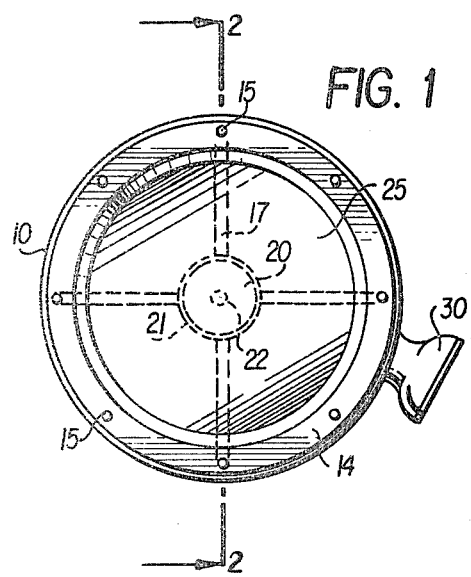
FIG. 1 is an elevational view of a mirror in accordance with the invention.
Figure 2:
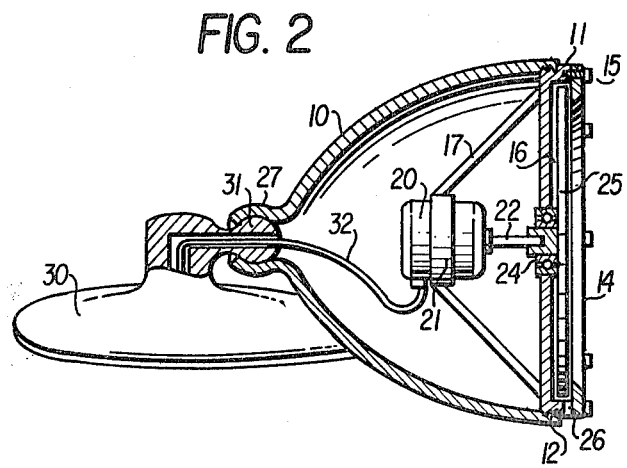
FIG. 2 is a side elevational section of the invention taken on lines 2—2 of FIG. 1.

Referring now to FIGS. 1 and 2, a half-ellipsoid or generally conical-shaped casing 10 is threaded to receive a circular support member 11 which has corresponding threads on its flange portion 12. A guard ring 14 is bolted by means of bolts 15 to flange portion 12, bolts 15 being disposed about guard ring 14 at intervals of 45° whereby it is affixed rigidly to the support member 11 and together therewith defines an annular space 16. Support member 11 has a pair of brackets 17 affixed rigidly thereto by welding or other appropriate connective means. Brackets 17 support an electrical motor 20, a steel band 21 being tightly secured to (or around) the inward ends of brackets 17 and around motor 20 to ensure that it is rigidly secured centrally within casing 10. A driving shaft 22 from motor 20 is received through a bearing 24 which is journaled in support member 11 and is affixed on its end away from motor 20 to a mirror 25. The axis of rotation of shaft 22 is at right angles to the plane of the mirror 25, whereby the reflective surface of mirror 25 is adapted to rotate within a surface of rotation coincident with said reflective surface so that its reflection characteristics are essentially the same irrespective of whether or not mirror 25 is rotating. Optionally, mirror 25 can be slightly convex. The periphery of mirror 25 is received in the annular space 16 whereby it is closely adjacent to, but not touching, either the support member 11 or the guard ring 14. In its lower aspects, the flange member 12 is provided with drain openings 26.

In the forward apex of casing 10, a ball and socket joint is provided with the casing 10 having the socket portion 27 and a mounting member 30 including a ball portion 31 which defines through it an opening to receive electrical leads 32 from motor 20. In the event that casing 10 is appropriately grounded to the vehicle, then a ground line may go directly to casing 10 and only one electrical lead 32 need pass through the opening in the ball portion 31 whereby it is connected through an activation switch to an electrical current source in the vehicle to which the mirror assembly is attached. Otherwise, two electrical leads are required, as will be understood by those skilled in the art. Electric motor 20 is adapted to the battery capacity of the vehicle—say twelve volts—and when energized, causes mirror 25 to spin at sufficient rpm whereby centrifugal force causes foreign matter thereon to be dislodged into the annular space 16, wherein it is guided to be eventually discharged through drain openings 26.

In operation, the embodiment shown in FIGS. 1 and 2 is mounted in a vehicle whereby the operator by adjusting casing 10 relative to the ball and socket joint made up of portions 27, 30 is enabled to view the road and traffic to his rear. However, in the event mirror 25 is occluded by rain, water condensation, ice, snow or the like, by energizing motor 20, foreign material on mirror 25 is quickly removed by the centrifugal force of the spinning mirror whereby the operator of the vehicle is enabled to utilize the mirror once again for its intended purpose. Should mirror 25 continue to become fogged or otherwise obstructed, such as might occur in a rainstorm, snowstorm or the like, then motor 20 is continuously energized and, as indicated, the mirror remains functional due to the circumstance that its reflective surface remains in the same plane irrespective of whether or not it is spinning.

Figure 3:
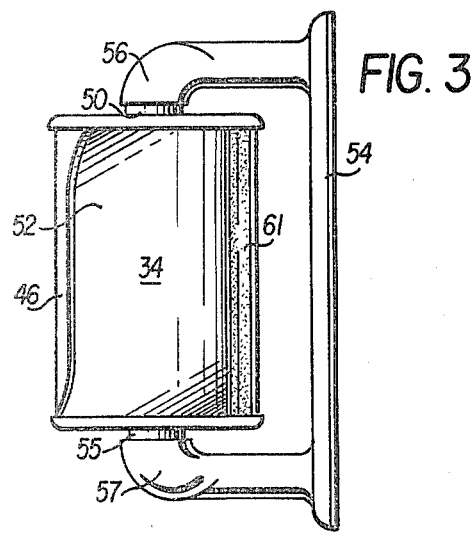
Figure 4:
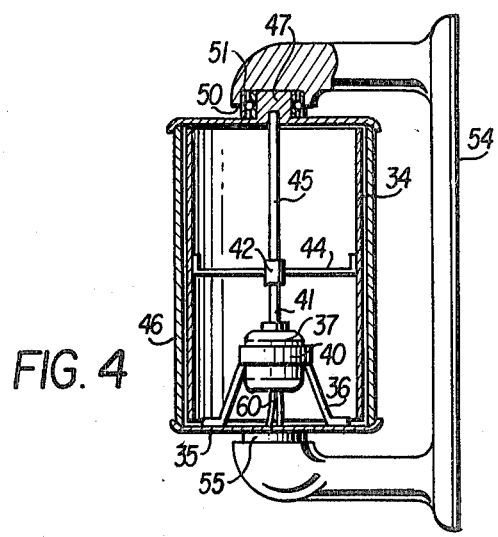
FIG. 4 is a sectional view of the mirror shown in FIG. 3.

FIGS. 3 and 4 disclose an embodiment where a mirror 34 is cylindrical and is rotated about a vertical axis. However, it is important to note that in such embodiment the surface of rotation of the mirror and its surface when not spinning are coincident as is the case with the embodiment in FIGS. 1 and 2. Mirror 34 is mounted on a stand member 35 which has affixed to it a pair of brackets 36 that support an electrical motor 37, with a band 40 encircling the upper ends of brackets 36 and motor 37 whereby the motor 37 is rigidly connected via brackets 36 and band 40 to member 35. A driving shaft 41 extending from motor 37 is connected by a coupling 42 to a disc-shaped member 44 which is secured to mirror 34 and by a further shaft 45 to the top of the mirror 34. Shafts 41 and 45 have a common axis of rotation which is coincident with the axis of rotation of the cylindrical mirror 34.

Also supported by stand member 35 is a guard member 46 which is spaced closely adjacent to mirror 34 but slightly spaced therefrom whereby mirror 34 rotates without contacting the guard member 46. However, a central protrusion 47 at the top of mirror 34 is received by a ring portion 50, extending upwardly from the guard member 46, which has journaled therein a ball-bearing 51 wherein protrusion 47 rotates.

As will be noted in FIG. 3, guard member 46 defines an opening 52 which exposes about one-third of the vertical surface of mirror 34. Ring member 50 and a stub member 55 extending downwardly from the center of stand member 35 are received frictionally by upper and lower joint members 56 and 57 of a mounting bracket 54 whereby the position of opening 52 may be set manually by turning guard member 46 so that it turns relative to bracket 54. In turn, bracket 54 is connected to a truck or other vehicle by connective means (which may be adjustable within limits) well known in the art. An electrical lead or leads 60 is received through openings forming a passage through stub member 55 and bracket 54 whereby it may be appropriately connected for selectively energizing motor 37. When motor 37 is so energized, mirror 34 is caused to rotate and foreign material is dislodged therefrom by centrifugal force. As in the previous embodiment, such rotation can be selective or continuous, depending whether or not the surface of mirror 34 is continually collecting matter which would diminish its capacity to reflect. If desired, a windshield wiper blade may be mounted at the edge 61 of opening 52 so that it bears on the mirror surface 34 whereby such mirror surface is continually cleaned by its rotation against the blade 61.

Figure 5:
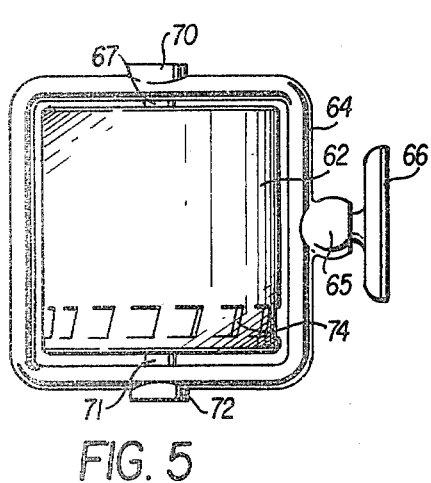
FIG. 5 is an elevational view of a further embodiment of the invention, wherein a cylindrical mirror is powered by the relative wind.

An alternative model of a cylindrical mirror is shown in FIG. 5, wherein a rectangular bracket 64 includes a ball and socket joint 65 whereby it may be connected to a vehicle by means of a mounting 66. Cylindrical mirror 62 is free to rotate about an axle 67 which is received in a bearing 70 journaled at the top of the rectangular bracket 64. A similar axle 71 extending from the bottom of mirror 62 is received in a bearing 72 which is journaled at the bottom of the bracket 64.

In its lower portion, mirror 62 has a plurality of wind vanes 74 formed therein whereby the relative wind of the vehicle causes mirror 62 to rotate via axles 67 and 71 in bearings 70 and 72. Thus, depending upon the velocity of the relative wind, foreign matter which may have collected on the surface of mirror 62 is readily dislodged by the centrifugal motion due to the turning of mirror 62, such turning resulting from the action of wind vanes 74 in a relative wind.

As before, the surface of mirror 62 is in the same cylindrical surface whether or not it is rotating relative to the vehicle and rectangular bracket 64. Axles 67 and 71 are rigidly connected to the interior of the mirror 62 by connective means not shown, but which, if desired, may include a pair of members similar to the disc-shaped member 44, one disposed near the upper side of the mirror and the other secured just above the wind vanes 74.

Figure 6:
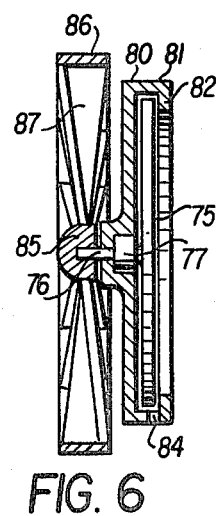
FIG. 6 is another embodiment of the invention shown in side section, wherein a disc-type mirror is caused to rotate by the relative wind.

In FIG. 6, a further wind-driven mirror is shown, the mirror 75 being provided with a centrally disposed shaft 76 received in a bearing 77 journaled in a disc-shaped support 80 which includes a flange 81 with an inwardly extending ring portion 82, there being drain openings 84 which perform the same function as drain openings 26 shown in FIG. 2. Connected to the forward end of shaft 76 is a hub 85 which is connected to a circular rim 86 by a plurality of propeller blades 87. As in all embodiments, mirror 75 rotates in the same reflective surface as it provides when not rotating. Support member 80 is connectable to a mounting member not shown whereby it can be mounted on a vehicle and be sufficiently adjustable by an operator of the vehicle so that he can utilize the mirror 75 as a rear vision mirror. Rim 86 is caused to rotate when relative wind rotates propeller blades 76, thus spinning mirror 75. Preferably rim 86 is of a sufficient weight so that its rotation continues due to the centrifugal inertia for a period of time even though the vehicle is stopped or relative wind otherwise is not causing rotation of mirror 75. As with the previous embodiments, the spinning of mirror 75 causes foreign material thereon to fly off, whereby it is dislodged into the annular space defined by disc member 80 together with flange 81 and ring portion 82, and thereafter guided within the annular space to be discharged through drains 84.

Figure 7:
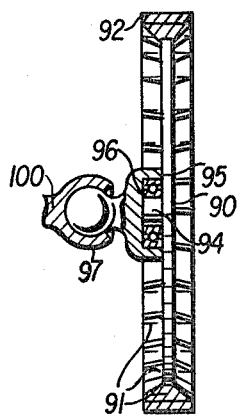
FIG. 7 is a simplified version of a disc-type mirror which is caused to rotate by the relative wind.

FIG. 7 discloses a simplified version of the invention wherein a mirror 90 is provided around its periphery with a plurality of canted blades 91 which are connected to a ring member 92 that is concentric with the axis of rotation of a shaft 94 connected to and extending forwardly from mirror 90. Shaft 94 is received by a ball bearing 95 journaled in a holder 96 which is connected by means of a ball and socket joint 97 to a vehicle mounting device 100. Here again, the relative wind causes the mirror 90 to rotate by the air passing through canted blades 91 whereby the mirror surface of mirror 90 remains in the same plane relative to the vehicle whether or not it is rotating. Thus foreign material, such as raindrops, snow, sleet or the like, is quickly dislodged through the centrifugal force acting on the mirror 90 when it is caused to be rotated. Also, as with FIG. 6, ring 92 functions as means to store energy, whereby mirror 90 continues to rotate for a short period even though the vehicle comes to a stop and blades 91 are no longer activated.

Although the preferred embodiments of the invention have been described in the foregoing specification, it is to be understood that the invention is capable of other adaptations and modifications within the scope of the appended claims. For example, the mirrors in each case may be caused to rotate via a train of gears from the power source to provide the most advantageous speed for both the power source and the mirror.

Having thus described my invention, what I claim as new and desire to secure by Letters Patent of the United States is:

1. A rear-vision mirror assembly which comprises a mirror, a supporting member for said mirror, a casing having an opening at its rear for connectably receiving said supporting member whereby said supporting member is connected to said casing by connecting means disposed only at said casing's rear, a motor for rotating said mirror surrounded by said casing, said motor being mounted solely on said supporting member, said supporting member including a bearing for supporting said mirror on a shaft extending from said mirror into said bearing, a further shaft from said motor being rigidly connected to said first mentioned shaft, said motor and said mirror being removable as a unit from said casing by the disconnection of said connecting means only.

2. A rear-vision mirror in accordance with claim 1, wherein said motor is an electric motor, electrical conduit means from said motor extending through an opening in the front of said casing.

3. A rear-vision mirror in accordance with claim 2, where a ball-and-socket joint is provided at the front of said casing in front of and coaxial with said motor for adjustably connecting said casing to a vehicle, said electrical conduit passing through said ball-and-socket joint for connection to said vehicle.

* * * * *